United States Patent [19]

Kato

[11] Patent Number: 6,075,233
[45] Date of Patent: Jun. 13, 2000

[54] IMAGE READING APPARATUS WITH A CURRENT CONTROLLER HAVING A BIPOLAR TRANSISTOR

[75] Inventor: Tetsuya Kato, Nagoya, Japan

[73] Assignee: Brother Kogyo Kabushiki Kaisha, Nagoya, Japan

[21] Appl. No.: 09/028,749

[22] Filed: Feb. 24, 1998

[30] Foreign Application Priority Data

Feb. 25, 1997 [JP] Japan .................................... 9-040828

[51] Int. Cl.[7] ........................................................ G01J 1/32
[52] U.S. Cl. ........................................... 250/205; 358/475
[58] Field of Search ................................ 250/205, 208.1, 250/214 R; 358/475, 468, 406, 405; 355/35

[56] References Cited

U.S. PATENT DOCUMENTS 5,134,273  7/1992  Wani et al. ............................. 250/205

Primary Examiner—Que T. Le
Attorney, Agent, or Firm—Oliff & Berridge, PLC

[57] ABSTRACT

An image reading apparatus includes an LED array which generates light of variable luminance in accordance with a supplied current for irradiating a document paper, an image sensor for receiving the light reflected by the document paper to generate image signals, a current controlling voltage supplier including a digital-to-analog converter for generating a current controlling voltage, and a current controller for controlling current supply to the light irradiator in response to the current controlling voltage from the current controlling voltage supplier. The current controller includes a first bipolar transistor having its base directly connected to the digital-to-analog converter, and a second bipolar transistor having its base connected to to the emitter of the first transistor.

14 Claims, 4 Drawing Sheets

IMAGE READING APPARATUS WITH A CURRENT CONTROLLER HAVING A BIPOLAR TRANSISTOR

BACKGROUND OF THE INVENTION

1. Field of the Invention

The present invention relates to an image reading incorporating a luminance control circuit for controlling the luminance or light intensity of a light source.

2. Description of the Related Art

A facsimile machine or a photocopying machine incorporates an image reading unit or apparatus for reading images of a document paper for example.

Typically, an image reading apparatus comprises a light source such as an LED array for irradiating a document paper with light, and an image sensor (photoelectric converter) for detecting the light reflected from the document paper to generate image signals. Normally, the light source is provided with a luminance control circuit for adjusting the luminance of the light source, thereby enabling the image sensor to suitably read the images of the document paper.

More specifically, as shown in FIG. 5 of the accompanying drawings, a prior art luminance control circuit for a light source of an image reading apparatus comprises an operation amplifier OP, a transistor $TR_5$ and a resistor $R_5$. The non-inverting input of the operation amplifier OP is connected to a current controlling voltage supplier (not shown). The base of the transistor $TR_5$ is connected to the output of the operation amplifier OP, whereas the collector of the transistor $TR_5$ is connected to an LED array 31 (a light source) which in turn is connected to a power supply source $V_{DD}$. The emitter of the transistor $TR_5$ is grounded through the resister $R_5$. Further, an intermediate portion between the emitter of the transistor TR5 and the resistor $R_5$ is connected to the inverting input of the operation amplifier OP for feedback. Thus, the current through the LED array 31 varies by changing the current controlling voltage applied to the non-inverting input of the operation amplifier OP.

However, with the prior art luminance control circuit shown in FIG. 4, since use is made of an operation amplifier OP which is a relatively costly element in addition to a bipolar transistor $TR_5$, the production cost of the image reading apparatus inevitably becomes relatively high.

SUMMARY OF THE INVENTION

It is, therefore, an object of the present invention is to provide an image reading apparatus which incorporates a luminance control circuit for adjusting the luminance or light intensity of a light source without using an operation amplifier.

According to a first aspect of the present invention, there is provided an image reading apparatus comprising: a light irradiator which generates light of variable luminance in accordance with a supplied current for irradiating an image carrying medium; a photoelectric converter for receiving the light reflected by the image carrying medium and for generating image signals; a current controlling voltage supplier including a digital-to-analog converter for generating a current controlling voltage; and a current controller for controlling current supply to the light irradiator in response to the current controlling voltage from the current controlling voltage supplier; wherein the current controller comprises a bipolar transistor having a base directly connected to the digital-to-analog converter of the current controlling voltage supplier.

According to the arrangement described above, since the bipolar transistor takes the place of an operation amplifier which is a relatively costly element, the production cost of the image reading apparatus may be reduced.

Typically, the light irradiator may comprise an LED array including a plurality of light emitting diodes arranged in an array. However, the present invention is not limited to such a light source.

Preferably, the current controller may comprise a plurality of bipolar transistors connected to each other to form a Darlington amplifier. In case where the light irradiator is an LED array, a current of 100–200 mA is sufficient. In such a case, therefore, the plurality of bipolar transistors may include two bipolar transistors one of which has its base directly connected to the digital-to-analog converter, whereas the other of the two bipolar transistors has its base connected to the emitter of the first-mentioned transistor.

The photoelectric converter may comprise a full-color or monochrome image sensor of the contact or non-contact type.

According to a preferred embodiment of the present invention, the current controlling voltage supplier comprises a central processing unit for supplying a set of current control data, and the central processing unit is connected to the image reading apparatus through a gate array in which the digital-to-analog converter is provided for converting the set of current control data to a current controlling voltage.

According to a second aspect of the present invention, there is provided an image reading apparatus comprising: a light irradiator which generates light of variable luminance in accordance with a supplied current for irradiating an image carrying medium; a photoelectric converter for receiving the light reflected by the image carrying medium and for generating image signals; a current controlling voltage supplier for generating a current controlling voltage; and a current controller for controlling current supply to the light irradiator in response to the current controlling voltage from the current controlling voltage supplier; wherein the current controller comprises a first bipolar transistor having a base connected to the current controlling voltage supplier, and a second bipolar transistor having a base connected to an emitter of the first transistor.

In a first embodiment of the second aspect of the present invention, the current controlling voltage supplier comprises a central processing unit for supplying a set of current control data, and a digital-to-analog converter connected to the central processing unit for converting the set of current control data to a current controlling voltage.

In a second embodiment of the second aspect of the present invention, the current controlling voltage supplier comprises a central processing unit for supplying a set of current control data, and a pulse width modulator connected to the central processing unit for generating modulated pulses having a duty cycle which is determined in accordance with the set of current control data, and a smoothing circuit for smoothing the modulated pulses to produce a current controlling voltage.

According to a third aspect of the present invention, there is provided an image reading apparatus comprising: a light irradiator which generates light of variable luminance in accordance with a supplied current for irradiating an image carrying medium; a photoelectric converter for receiving the light reflected by the image carrying medium and for generating image signals; a current controlling voltage supplier including a pulse width modulator for generating modulated pulses having a variable duty cycle, and a smoothing circuit for smoothing the modulated pulses to produce a current controlling voltage; and a current controller for controlling current supply to the light irradiator in response to the current controlling voltage from the current controlling voltage supplier; wherein the current controller comprises a bipolar transistor having a base connected to the smoothing circuit of the current controlling voltage supplier.

Other objects, features and advantages of the present invention will be apparent from the detailed description of the embodiment given below with reference to the accompanying drawings.

DETAILED DESCRIPTION OF THE PREFERRED EMBODIMENTS

The preferred embodiments of the present invention will be described below with reference to the accompanying drawings.

Figure 1:
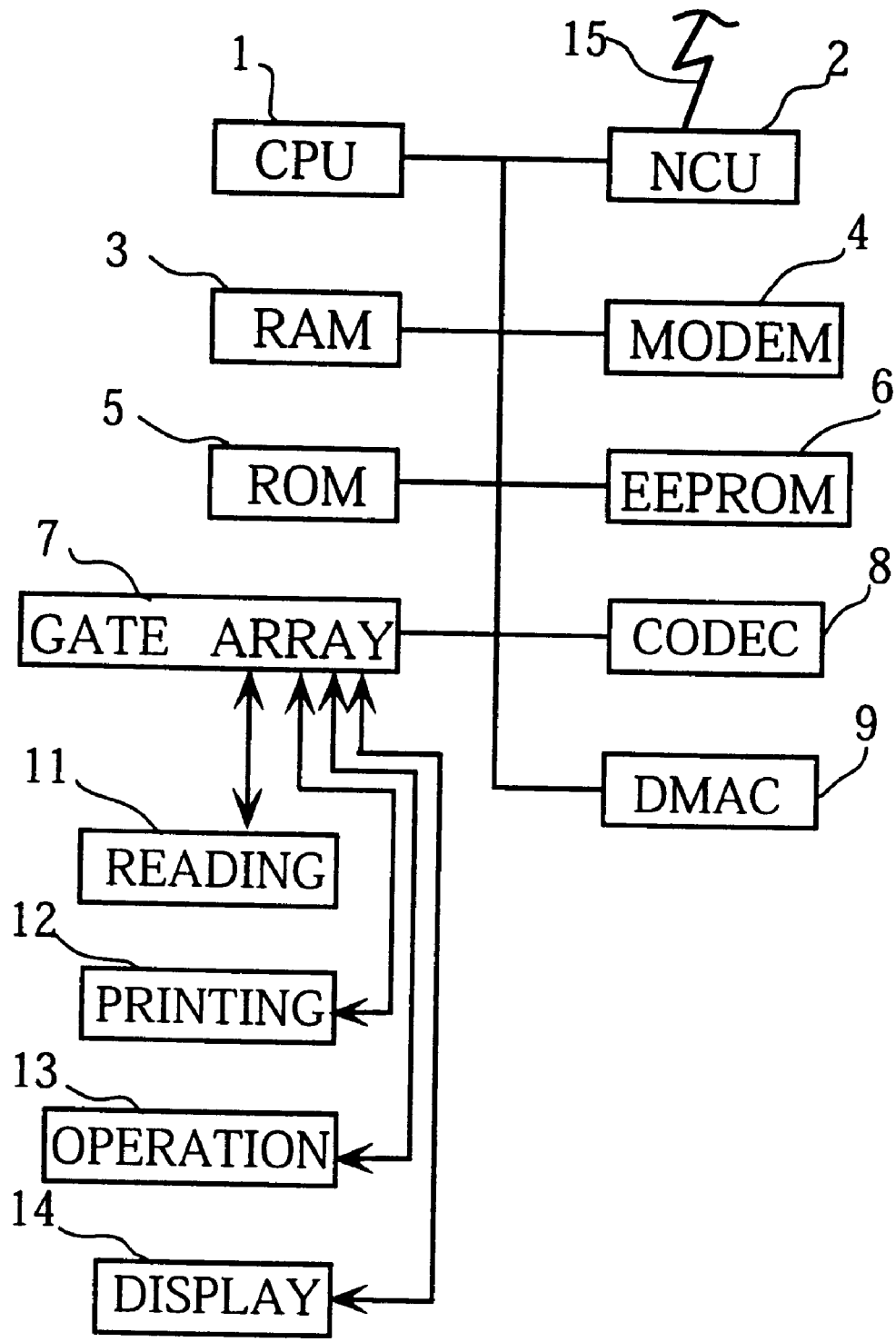
FIG. 1 is a circuit block diagram showing a facsimile machine which incorporates an image reading unit embodying the present invention.

Reference is first made to FIG. 1 which is a circuit block diagram of a facsimile machine embodying the present invention. This facsimile machine comprises a CPU (central processing unit) 1, an NCU (network control unit) 2, a RAM (random access memory) 3, a modem (modulator-demodulator) 4, a ROM (read-only memory) 5, an EEPROM (electrically erasable and programmable ROM) 6, a gate array 7, a codec (coder-decoder) 8, and a DMAC (direct memory access controller) 9. Further, the facsimile machine also comprises a reading unit 11, a recording unit 12, an operation unit 13, and a display unit 14.

The CPU 1, the NCU 2, the RAM 3, the modem 4, the ROM 5, the EEPROM 6, the gate array 7, the codec 8 and the DMAC 9 are connected to each other via bus lines (digital lines) and driven with a DC power source of 5 volts for example. The bus lines include data bus lines, address bus lines and control signal bus lines. The gate array 7 is connected to the reading unit 11, the recording unit 12, the operation unit 13 and the display unit 14, respectively.

The CPU 1 provides an overall control of the facsimile machine as a whole.

The NCU 2 is connected to a telephone line 15 for providing network control. The NCU 2 is also connected to the modem 4 through an analog line.

The RAM 3 stores various digital data such as image data. Of course, an additional RAM or RAMs may be provided to increase the capacity of data storage.

The modem 4 modulates the transmitting codes and demodulates the received codes.

The ROM 5 stores various programs or the like as required for controlling the facsimile machine, whereas the EEPROM 6 stores registered data (e.g. shortcut dials) and/or flags.

The gate array 7 functions as an I/O interface (input/output interface) for the CPU 1 for data transmission to and/or from the reading unit 11, the recording unit 12, the operation unit 13 and the display unit 14.

The codec 8 performs coding of the transmitting image data and decoding of the received image data.

The DMAC 9 provides memory access control with respect to the RAM 3 and EEPROM 6 for example.

Figure 3:
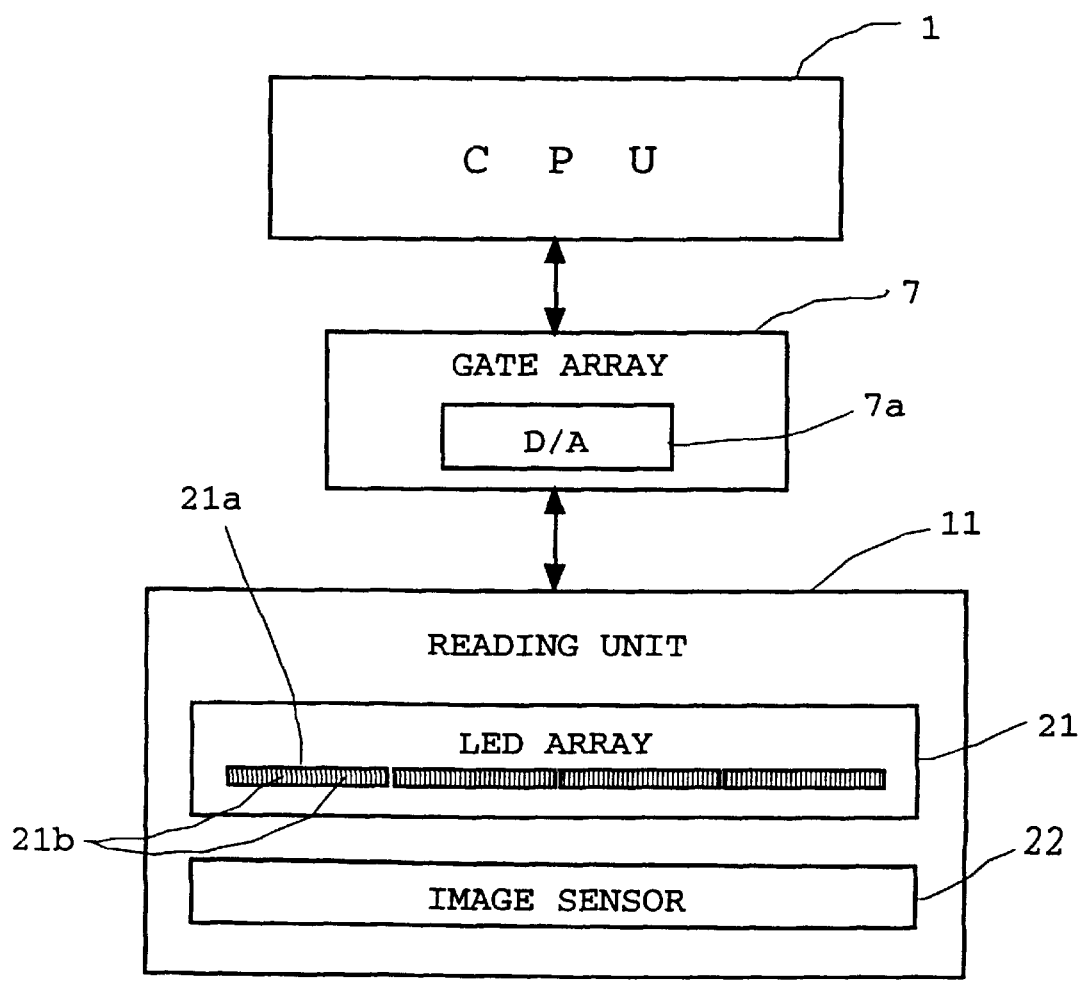
FIG. 3 is a block diagram showing the image reading unit of the same facsimile machine together with a current controlling voltage supplier therefor.

The reading unit 11 reads out the image data from a document paper (not shown) for output through the gate array 7. More specifically, as shown in FIG. 3, the reading unit includes an LED array 21 for irradiating the document paper with light, and an image sensor 22 for receiving the light reflected on the document paper to generate image detection signals. The LED array 21 may include a row of LED array chips 21a each having an array of light emitting diodes 21b. The LED array chips 21a are connected in series in the illustrated embodiment, but they may be connected in parallel. The image sensor 22, which works as a photoelectric conversion device, may be a full-color CCD image sensor of the contact or non-contact type. Though not shown, the reading unit 11 further includes a feed motor and rollers operatively connected to the feed motor for transferring the document paper.

The recording unit 12 performs printing of images on a recording paper sheet (not shown) on the basis of the image data received from the reading unit 11 through the gate array 7. For this purpose, the recording unit 12 includes a motor (not shown) and rollers (not shown) connected to the motor for transferring a recording paper (not shown), in addition to a printhead (not shown) such as an ink jet printhead or a thermal printhead for printing out the received image data onto the recording paper.

The operation unit 13 has key switches (not shown) to be operated by the user for output of operation signals, whereas the display unit 14 includes an LCD (not shown) or the like for providing various indications under the control of the CPU 1.

Figure 2:
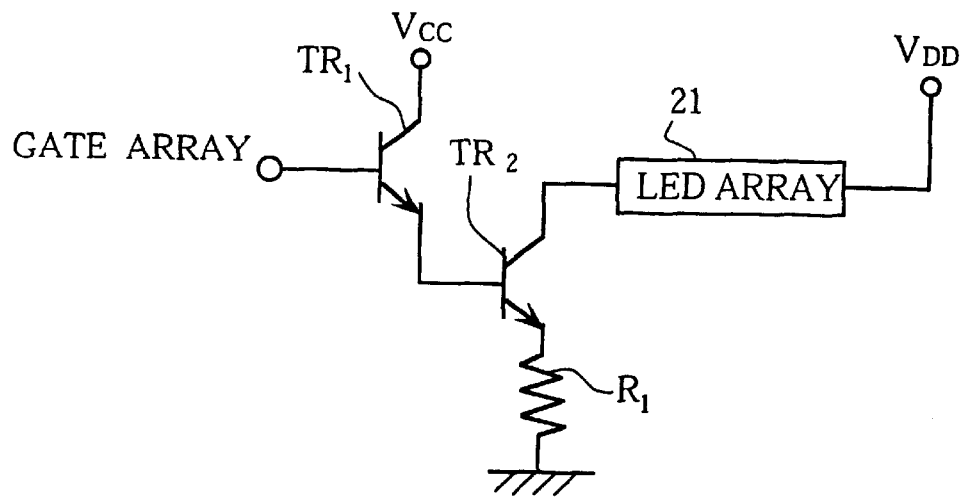
FIG. 2 is a circuit diagram showing an adjustable power supply circuit for the image reading unit of the facsimile machine.

FIG. 2 is a circuit diagram of an adjustable power supply circuit which is incorporated in the reading unit 11. In addition to the LED array 21 as a light source, the adjustable power supply circuit includes a first bipolar transistor $TR_1$, a second bipolar transistor $TR_2$ and a resistor $R_1$. The base of the first transistor $TR_1$ is connected to the gate array 7, whereas the collector of the first transistor $TR_1$ is connected to a power source $V_{CC}$. The emitter of the first transistor $TR_1$ is connected to the base of the second transistor $TR_2$. The emitter of the second transistor $TR_2$ is grounded through the resistor $R_1$, whereas the collector of the second transistor $TR_2$ is connected to another power source $V_{DD}$ of e.g. 26V through the LED array 21. In this way, the two bipolar transistors $TR_1$, $TR_2$ are connected to form a Darlington amplifier.

As shown in FIG. 3, the gate array 7 incorporates a digital-to-analog converter 7a which, in combination with the CPU 1, constitutes a current controlling voltage supplier for the light irradiating circuit (FIG. 2). On the other hand, the first and second transistors TR1, TR2 constitute a current controller which supplies a variable current to the LED array 21 in response to the variable voltage received from the current controlling voltage supplier.

The facsimile machine thus designed operates in the following manner.

In the transmission mode, the reading unit 11 reads the images of an image carrying paper sheet for output of image data. Then, the image data are coded at the codec 8 and modulated at the modem 4 for transmission through the NCU 2 and the telephone line 15.

In the reception mode, input image data received through the NCU 2 are demodulated at the modem 4 and decoded at the codec 8. Then, the recording unit 12 prints out the decoded image data on a recording paper sheet.

In the copy mode, the reading unit 11 reads the images of an image carrying paper sheet for output of image data which are transmitted, through the gate array 7, to the recording unit 12 for printing on a recording paper as reproduced images.

On the other hand, the light irradiating circuit (FIG. 2) and the current controlling voltage supplier (FIG. 3) operate in the following manner.

When a set of current control data in predetermined bits is transmitted from the CPU 1, the D/A converter 7a converts the set of current control data to a current controlling voltage for application to the the base of the first transistor $TR_1$ in the reading unit 11. As a result, the first and second transistors $TR_1$, $TR_2$ become conductive, and the base current of the first transistor $TR_1$ is amplified as an emitter current which is applied to the base of the second transistor $TR_2$, whereby an adjusted collector current of the second transistor $TR_2$ is passed through the LED array 21. The following equation (1) reflects the relationship among the base voltage (current controlling voltage) $V_B$ of the first transistor $TR_1$, the base-to-emitter voltage $V_{BE1}$ of the first transistor $TR_1$, the the base-to-emitter voltage $V_{BE2}$ of the second transistor $TR_2$ and the emitter voltage $V_E$ of the second transistor $TR_2$.

$$V = V_B - V_{BE1} - V_{BE2} \quad (1)$$

Further, the following equation (2) represents the relationship among the collector current $I_C$ of the second transistor $TR_2$, the base current $I_B$ of the second transistor $TR_2$ and the resistance R of the resistor $R_1$.

$$I_C = (V_E/R) - I_B \quad (2)$$

In the above equation (1), since the base-to-emitter voltage $V_{BE1}$ of the first transistor $TR_1$ and the the base-to-emitter voltage $V_{BE2}$ of the second transistor $TR_2$ may be considered to be substantially constant despite a change in the respective collector currents of the first and second transistors TR1, TR2, the emitter voltage $V_E$ of the second transistor $TR_2$ is unilaterally determined by the base voltage (current controlling voltage) $V_B$ of the first transistor $TR_1$. In other words, a current passes through the resistor $R_1$ such that the emitter voltage $V_E$ of the second transistor $TR_2$ is unilaterally determined by the current controlling voltage $V_B$ transmitted from the gate array 7 (i.e., D/A converter 7a). The current passing through the resistor $R_1$ is the emitter current of the second transistor $TR_2$ which is the sum of the collector current $I_C$ of the second transistor $TR_2$ and the base current $I_B$ of the second transistor $TR_2$. However, since the base current $I_B$ of the second transistor $TR_2$ is much smaller than the collector current $I_C$ of the second transistor $TR_2$, the collector current $I_C$ of the second transistor $TR_2$ is virtually proportional to the emitter voltage $V_E$ of the second transistor $TR_2$. Thus, by adjusting the current controlling voltage $V_B$, it is possible to correspondingly adjust the current supply to the LED array 21, i.e., the luminance of the LED array 21.

Assuming for example that the base-to-emitter voltage $V_{BE1}$ of the first transistor $TR_1$ is 0.5V and that the the base-to-emitter voltage $V_{BE2}$ of the second transistor $TR_2$ is also 0.5V, if the current controlling voltage $V_B$ (namely, the base voltage of the first transistor $TR_1$) is 10V, the emitter voltage $V_E$ of the second transistor $TR_2$ is 9V, so that a current passes through the LED array 21 to generate the corresponding voltage (9V) voltage across the resistor $R_1$. If the current controlling voltage $V_B$ is reduced to 5V, the emitter voltage $V_E$ of the second transistor $TR_2$ reduces 4V, so that a reduced current passes through the LED array 21 to generate the corresponding (4V) voltage across the resistor $R_1$. As a result, the luminance of the LED array 21 reduces correspondingly.

Figure 4:
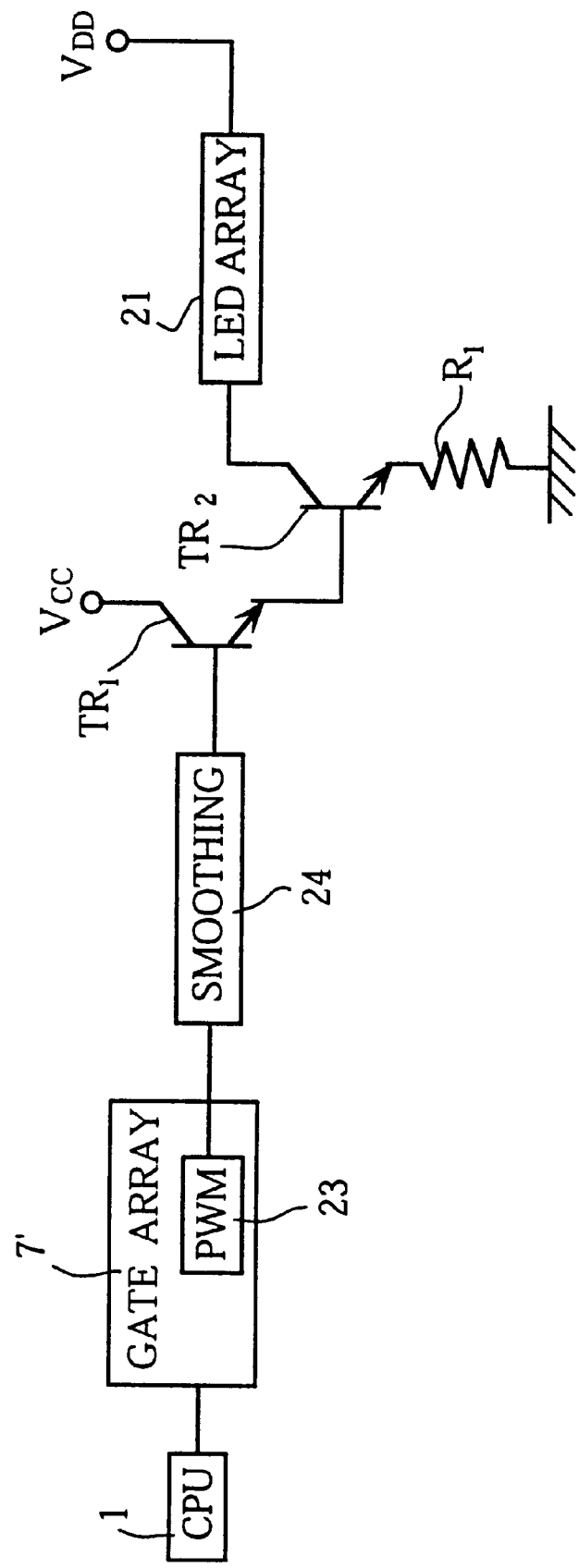
FIG. 4 is a block diagram showing the image reading unit of the same facsimile machine together with another current controlling voltage supplier therefor.
Figure 5:
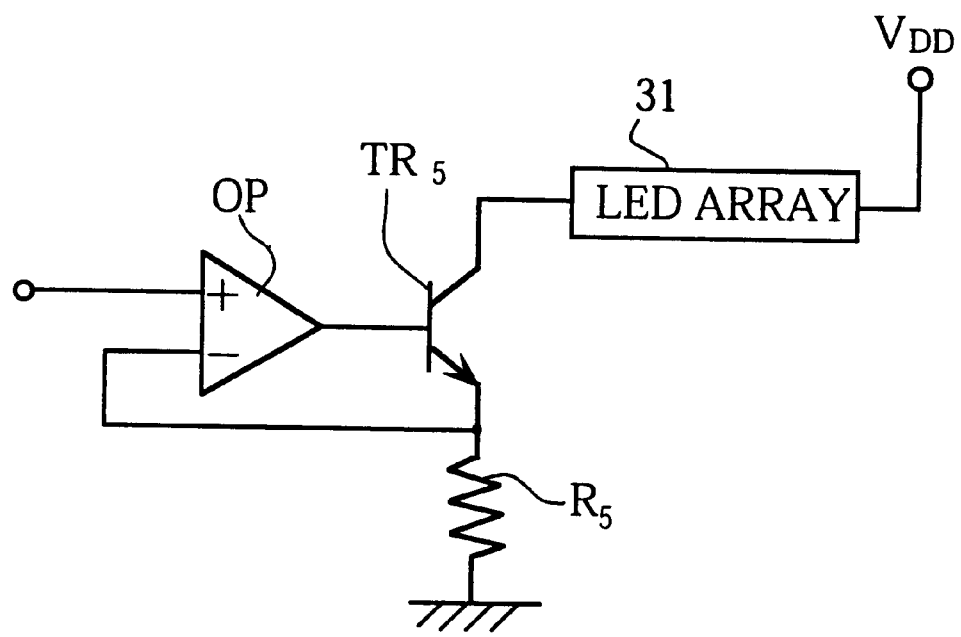
FIG. 5 is a circuit diagram showing an adjustable power supply circuit for a prior art image reading apparatus.

FIG. 4 shows another example of current controlling voltage supplier. Specifically, the current controlling voltage supplier in this example includes, in addition to the CPU 1, a pulse width modulator (PWM) 23 incorporated in a gate array 7', and a smoothing circuit 24 connected between the pulse width modulator 23 and the base of the first transistor TR1.

When a set of current control data in predetermined bits is transmitted from the CPU 1, the pulse width modulator 23 generates modulated pulses the duty cycle of which is determined by the set of current control data. The modulated pulses thus generated are smoothed by the smoothing circuit 24 to provide a current controlling voltage which corresponds to the duty cycle of the modulated pulses. Thus, by adjusting the duty cycle of the modulated pulses to be generated by the pulse width modulator 23, it is possible to correspondingly adjust the current supply to the LED array 21, i.e., the luminance of the LED array 21.

According to the illustrated embodiments, the image reading unit 11 incorporates only two bipolar transistors TR1, TR2 for adjusting the luminance of the LED array 21 instead of relying on an operation amplifier which is a relatively costly element. Thus, it is possible to reduce the production cost of the facsimile machine which incorporates the image reading unit 11.

The present invention being thus described, it is obvious that the same may be varied in many ways. For instance, the present invention is not limited in applicability to an image reading unit of a facsimile machine, but may be equally applicable to an image scanner. Such variations should not be regarded as a departure from the spirit and scope of the present invention, and all such modifications as would be obvious to those skilled in the art are intended to be included within the scope of the following claims.

What is claimed is:

1. An image reading apparatus comprising:
    a light irradiator which generates light of variable luminance in accordance with a supplied current for irradiating an image carrying medium;
    a photoelectric converter for receiving the light reflected by the image carrying medium and for generating image signals;
    a current controlling voltage supplier including a digital-to-analog converter for generating a current controlling voltage; and
    a current controller for controlling current supply to the light irradiator in response to the current controlling voltage from the current controlling voltage supplier;
    wherein the current controller comprises a bipolar transistor having a base directly connected to the digital-to-analog converter of the current controlling voltage supplier.

2. The image reading apparatus according to claim 1, wherein the current controller comprises a plurality of bipolar transistors connected to each other to form a Darlington amplifier, the plurality of bipolar transistors including a first bipolar transistor having a base directly connected to the digital-to-analog converter.

3. The image reading apparatus according to claim 1, wherein the current controlling voltage supplier comprises a central processing unit of a facsimile machine for supplying a set of current control data, the central processing unit being connected to the image reading apparatus through a gate array in which the digital-to-analog converter is provided for converting the set of current control data to a current controlling voltage.

4. The image reading apparatus according to claim 1, wherein the light irradiator comprises an LED array including a plurality of light emitting diodes arranged in an array.

5. An image reading apparatus comprising:
   a light irradiator which generates light of variable luminance in accordance with a supplied current for irradiating an image carrying medium;
   a photoelectric converter for receiving the light reflected by the image carrying medium and for generating image signals;
   a current controlling voltage supplier for generating a current controlling voltage; and
   a current controller for controlling current supply to the light irradiator in response to the current controlling voltage from the current controlling voltage supplier;
   wherein the current controller comprises a first bipolar transistor having a base connected to the current controlling voltage supplier, and a second bipolar transistor having a base connected to an emitter of the first transistor.

6. The image reading apparatus according to claim 5, wherein the current controlling voltage supplier comprises a central processing unit for supplying a set of current control data, and a digital-to-analog converter connected to the central processing unit for converting the set of current control data to a current controlling voltage.

7. The image reading apparatus according to claim 6, wherein the central processing unit is incorporated in a facsimile machine, the digital-to-analog converter being provided in a gate array connecting the central processing unit to the image reading apparatus.

8. The image reading apparatus according to claim 5, wherein the current controlling voltage supplier comprises a central processing unit for supplying a set of current control data, and a pulse width modulator connected to the central processing unit for generating modulated pulses having a duty cycle which is determined in accordance with the set of current control data, and a smoothing circuit for smoothing the modulated pulses to produce a current controlling voltage.

9. The image reading apparatus according to claim 8, wherein the central processing unit is incorporated in a facsimile machine, the pulse width modulator being provided in a gate array connected to the central processing unit, the smoothing circuit being connected between the gate array and the base of the first bipolar transistor.

10. The image reading apparatus according to claim 5, wherein the light irradiator comprises an LED array including a plurality of light emitting diodes arranged in an array.

11. An image reading apparatus comprising:
   a light irradiator which generates light of variable luminance in accordance with a supplied current for irradiating an image carrying medium;
   a photoelectric converter for receiving the light reflected by the image carrying medium and for generating image signals;
   a current controlling voltage supplier including a pulse width modulator for generating modulated pulses having a variable duty cycle, and a smoothing circuit for smoothing the modulated pulses to produce a current controlling voltage; and
   a current controller for controlling current supply to the light irradiator in response to the current controlling voltage from the current controlling voltage supplier;
   wherein the current controller comprises a bipolar transistor having a base connected to the smoothing circuit of the current controlling voltage supplier.

12. The image reading apparatus according to claim 11, wherein the current controller comprises a plurality of bipolar transistors connected to each other to form a Darlington amplifier, the plurality of bipolar transistors including a first bipolar transistor having a base connected to the smoothing circuit.

13. The image reading apparatus according to claim 11, wherein the current controlling voltage supplier comprises a central processing unit of a facsimile machine for supplying a set of current control data, the central processing unit being connected to the image reading apparatus through a gate array in which the pulse width modulator is provided for generating the modulated pulses in accordance with the set of current control data.

14. The image reading apparatus according to claim 11, wherein the light irradiator comprises an LED array including a plurality of light emitting diodes arranged in an array.

* * * * *